No. 740,178. PATENTED SEPT. 29, 1903.
D. RAIT, Jr.
BOUQUET HOLDER.
APPLICATION FILED MAR. 11, 1903.
NO MODEL.
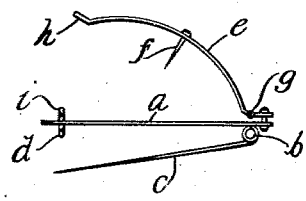
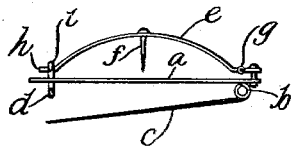
WITNESSES
S. L. Gottheimer.
J. C. Larsen
INVENTOR
David Rait Jr.
BY
Edgar Tate & Co.
ATTORNEYS No. 740,178. Patented September 29, 1903.

UNITED STATES PATENT OFFICE.

DAVID RAIT, JR., OF LARCHMONT MANOR, NEW YORK.

BOUQUET-HOLDER.

SPECIFICATION forming part of Letters Patent No. 740,178, dated September 29, 1903.

Application filed March 11, 1903. Serial No. 147,268. (No model.)

*To all whom it may concern:*

Be it known that I, DAVID RAIT, Jr., a citizen of the United States, residing at Larchmont Manor, in the county of Westchester and State of New York, have invented certain new and useful Improvements in Bouquet-Holders, of which the following is a specification, such as will enable those skilled in the art to which it appertains to make and use the same.

The object of this invention is to provide an improved device by means of which an ordinary bouquet or bunch of flowers connected in any manner may be conveniently secured to a garment at any desired point; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of a bouquet-holder involving my invention; Fig. 2, a similar view, but showing the parts in a different position; and Fig. 3 a plan view thereof.

In the practice of my invention I provide a central plate $a$, which, as shown in the drawings, is substantially elliptical in form and pointed at both ends; but this plate may be of any desired shape.

Secured to the bottom of the plate $a$ at one end and as shown at $b$ is an ordinary safety-pin $c$, and the opposite end of said plate is provided at the bottom thereof with an ordinary safety-pin hook $d$, with which the pin $c$ is adapted to engage.

Secured to the top of the plate $a$, opposite the connection of the safety-pin $c$, is a holder $e$, which is preferably curved, as shown, and which may be made flexible and elastic, if desired, and which is provided with a central pin $f$, which projects in the direction of the plate $a$.

The holder $e$ may be connected with the plate $a$ in any desired manner; but, as shown in the drawings, this connection is made by means of a hinge $g$, and the free end of said holder is pointed or provided with a projection $h$, which operates in connection with a hook $i$, secured to the plate $a$. The connection of the holder $e$ with the plate $a$ may, if desired, be made in the same manner as that of the safety-pin $c$ at $b$, and my invention is not limited to any particular way of connecting these parts.

In operation the stems of the flowers, which are tied together in the usual manner, are placed across the plate $a$, and the holder $e$ is depressed thereon, and the pin $f$ passes through the stems, and the projecting portion $h$ of the holder $e$ is engaged with the hook $i$ or passed thereunder. If the connection of the holder $e$ with the plate $a$ be made by means of a hinge, the parts will be made small enough and short enough to permit the free end of the holder $e$ to be depressed under the hook $i$, where it will be held by the spring action of the holder; but if the connection of the holder $e$ is made in the same manner as that of the pin $c$ the said holder will engage the hook $i$, and the pin $f$ will hold the flowers in position regardless of the size or length of the parts.

This device is simple in construction and operation and perfectly adapted to accomplish the result for which it is intended.

My improved bouquet-holder may be made of any desired metal, and the holder $e$ may be ornamented, as may also the plate $a$, with any preferred designs, which may be stamped or otherwise formed thereon.

Having fully described my invention, what I claim as new, and desire to secure by Letters Patent, is—

A bouquet-holder, comprising a central member, a safety-pin device connected with the bottom thereof and a holder connected with the top thereof at one end thereof and free to swing on its connection, said holder being bowed or curved away from said plate at the middle and provided with an inwardly-directed pin, and the free end of said holder being adapted to engage a hook connected with the central member, substantially as shown and described.

In testimony that I claim the foregoing as my invention I have signed my name, in presence of the subscribing witnesses, this 10th day of March, 1903.

DAVID RAIT, JR.

Witnesses:
F. A. STEWART,
J. C. LARSEN.